UNITED STATES PATENT OFFICE.

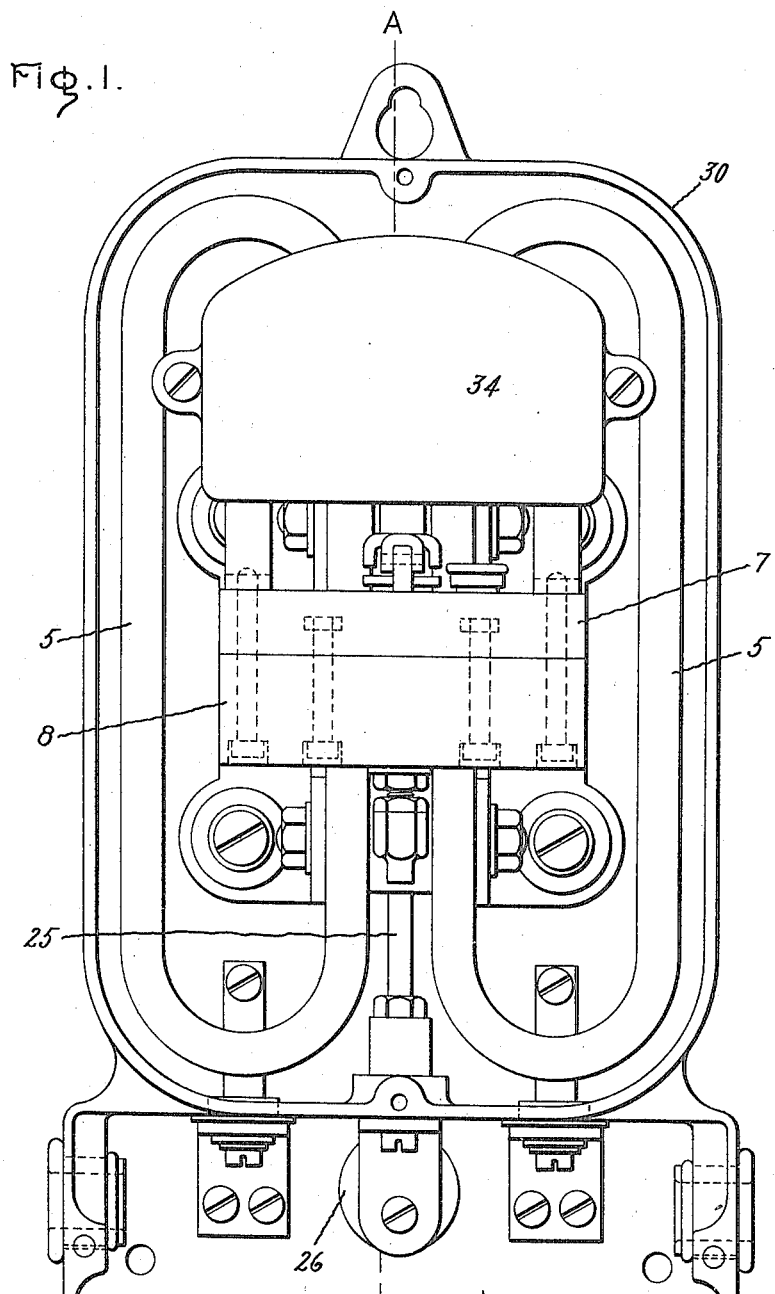

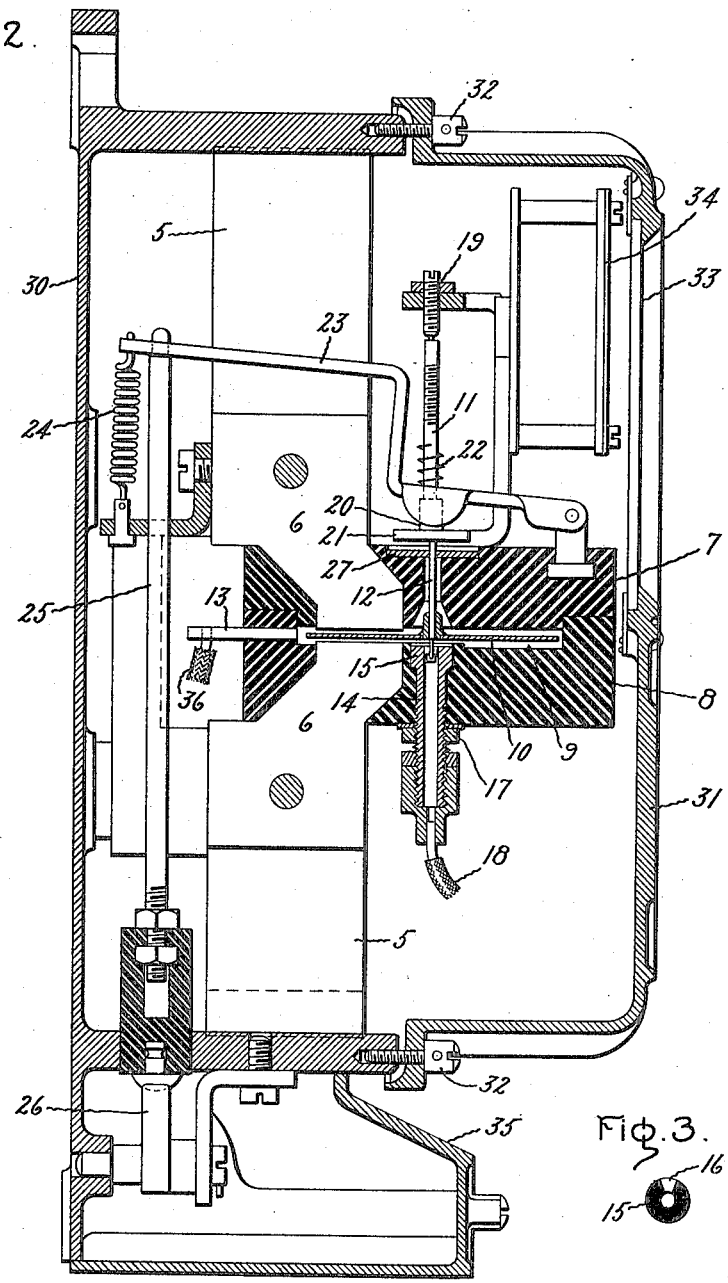

ARTHUR PRIMROSE YOUNG, OF DOVEDALE, NEAR RUGBY, ENGLAND, ASSIGNOR TO GENERAL ELECTRIC COMPANY, A CORPORATION OF NEW YORK.

ELECTRICAL MEASURING INSTRUMENT.

1,164,246.     Specification of Letters Patent.     Patented Dec. 14, 1915.

Application filed November 29, 1913. Serial No. 803,686.

*To all whom it may concern:*

Be it known that I, ARTHUR PRIMROSE YOUNG, a subject of the King of Great Britain, residing at Dovedale, near Rugby, county of Warwickshire, England, have invented certain new and useful Improvements in Electrical Measuring Instruments, of which the following is a specification.

My invention relates to electrical measuring instruments and particularly to electric meters of the motor type, and more particularly to electrical measuring instruments of the mercury motor type in which a disk or cup of copper or other conducting material rotates in a bath of or a chamber filled with mercury. In such meters the current to be measured, or a predetermined proportion thereof, is conducted to a contact or terminal in contact with the mercury and passing to the disk traverses the whole or a portion of the diameter of the disk, and then passes to a second contact or terminal also in contact with the mercury.

The objects of my invention are to improve and simplify the construction of such measuring instruments and to reduce the cost of their manufacture while greatly increasing their accuracy and efficiency.

More specifically one object of my invention is to provide an improved form of contact or terminal for an electrical measuring instrument of the mercury motor type.

Another object of my invention is to provide a sealing device for such instruments for effectively closing the aperture in the mercury chamber through which the disk shaft or spindle passes, so that the mercury cannot escape while the instrument is not fixed in its operative position or is being transported from one place to another.

Further objects of my invention will be pointed out in greater detail hereinafter.

The features of my invention which I consider patentably novel are definitely indicated in the claims appended hereto.

The details of construction and mode of operation of an electrical measuring instrument of the mercury motor type embodying the features of my invention will be understood from the following description taken in connection with the accompanying drawings, in which—

Figure 1 is a front elevation with the cover of the casing removed of an instrument or meter constructed according to my invention; Fig. 2 is a vertical side elevation of the meter taken on the line A—A of Fig. 1, and Fig. 3 is a detail plan view of the rotatably movable center contact.

In carrying out the broad features of my invention I provide a measuring instrument of the mercury motor type in which the disk, rotatably arranged in the mercury bath, has a thickness of half the length of the air gap between the faces of the pole pieces. I, further, secure the magnets to these pole pieces, which are molded into disks of insulating material coöperating to form the chamber for the mercury bath, and so design, proportion and construct the various parts of the instrument that the most efficient results are obtained. These and other novel features of my improved measuring instrument will be best understood by reference to the accompanying drawings.

In carrying my invention into effect, as illustrated, I employ a pair of large magnets 5—5 adapted to be secured to common pole pieces 6—6. These pole pieces, which may be exactly similar in shape, are molded into two disks or blocks of insulating material 7 and 8, which are firmly secured together, and coöperate to form between them the chamber 9 for the mercury in which the disk rotates. Each pole piece preferably projects a short distance into the chamber 9 leaving an air gap between the two pole faces of the pole pieces of approximately eight hundredths of an inch. Each pole face is preferably of rectangular cross section, the dimensions being, for example, about one-half inch wide by eleven-sixteenths inch long, so arranged that the longer axis of each pole face lies in a radial direction.

An amalgamated disk 10 of about 2 inches in diameter is rotatably mounted in the mercury chamber 9 and between the pole faces. The thickness of the disk 10 is exactly one-half the length of the air gap in which it rotates, that is, in the present example, the disk is about four-hundredths of an inch thick. I have found that this relation between the disk thickness and the length of the air gap is such as to give the most accurate and efficient results. I have also found that the dimensions of the disk, air gap and pole faces given above give the best results obtainable in practice.

The disk is mounted on a shaft or spindle 11 preferably made of German silver and the portion 12 of the shaft which passes through the top surface of the mercury is reduced in diameter to about the same as the width of the air gap. I have found that by using a shaft of this diameter the skin friction does not produce any detrimental effect upon the accuracy of the meter on account of the large torque I am able to obtain with my construction. The shaft is also very rigid and after the disk has been once trued up there is little liability of its getting out of alinement.

A contact 13 is molded into the disk of insulating material 8 and is in electrical engagement at one end with the mercury in the chamber 9. The contact 13 serves as one terminal of the instrument and conducts the current to or from the mercury. A coöperating contact and terminal is fitted in the disk 8 and is arranged concentrically with respect to the rotatable shaft of the instrument. This latter contact is of novel construction so as to permit the effective distance between the two coöperating contacts to be adjusted whereby the electrical resistance of the conducting path between the contacts is varied, and accordingly the current passing through the disk is varied.

The construction of the concentrically arranged terminal constitutes an improved feature of my invention. This terminal comprises an adjustable contact having a substantially flat end parallel with the rotatable disk and which is normally flush with the surface of the walls or sides of the chamber containing the mercury. The terminal is fitted with means whereby it can be readily rotated and a portion of the surface which is in contact with the mercury is amalgamated while the remainder of this surface is coated with an insulating varnish. The amalgamated portion is eccentric to the axis of rotation of the terminal so that when the terminal is rotated the distance between the portion at which the current leaves or enters the contact and the other contact, which may obviously be of any suitable construction and is preferably opposite the periphery of the disk as illustrated in the drawings, is increased or diminished.

The centrally located terminal comprises a hollow stem 14 having an enlarged head 15 which is normally practically flush with the bottom of the mercury bath. The upper side of the head 15 is amalgamated at the portion 16, as indicated by the light portion in Fig. 3 of the drawings. The remainder of the head is coated with an insulating varnish. The head fits into a recess in the insulating disk or block 8, and is prevented from turning by a nut 17 which is screwed on the outside of the hollow stem 14 and engages with the lower side of the disk 8 so that by slackening the nut 17 the stem can be turned or rotated, thereby varying the position of the amalgamated portion 16 of the head with respect to the fixed contact 13. Current is led to the contact by means of a flexible lead 18.

I have found that by employing a contact such as above described the speed of the meter can be very finely adjusted. With an unshunted meter I have obtained as large as five per cent. variation by merely rotating the contact through an angle of 180 degrees. With a shunted meter a considerably greater adjustment than this can be obtained, as the position of the contact will not only alter the distribution of the current passing through the disk in relation to the magnetic flux but will very considerably alter the resistance between the contacts and correspondingly vary the current passing through the disk.

The rotatable shaft 11 is provided at its ends with fine polished steel pins, the upper one of which bears against a suitably supported bearing 19. The lower pin may have a bearing similar to the upper bearing or may be guided by means of a ring. As the disk is forced upward by the mercury, there will be no pressure on the lower bearing.

Another improved feature of my present invention consists in the sealing device which I have devised for effectively closing the aperture in the mercury chamber through which the rotatable disk shaft passes. This feature of my invention consists in providing a sleeve and disk on the meter shaft above the mercury chamber, which fits the shaft sufficiently lightly to rotate therewith, but which can be caused to slide on the shaft when required, and in providing mechanism adapted to be operated outside the meter casing for forcing the sleeve and disk down on to the top of the chamber cover. This feature of my invention will be best understood by reference to Fig. 2 of the drawings.

In Fig. 2 there is shown a small sleeve 20 of brass or other suitable material having a disk or flange 21 at its lower end. This sleeve surrounds the shaft 11 and has a good sliding fit thereon and is normally held away from the opening in the top of the mercury chamber cover by means of a light spring 22 also carried by the shaft. A lever 23 pivoted at one end on the front of the disk 7 of the mercury chamber cover passes over the top of the chamber so that part of it can engage the sleeve or flange and at its other end is pulled downward by means of a stout or heavy spring 24. A packing rod 25 which passes down through the bottom of the meter casing projects into the path of the lever 23 in such a manner that when the rod is raised it raises the lever with it and tensions the spring 24, thereby allowing the spring 22 to raise the sleeve away from the top of the chamber. When the rod is lowered the spring 24 overcomes the spring 22 and forces the sleeve and disk 21 downward on to the top of the chamber, which is preferably recessed to receive it. The lower face of the disk 21 may be covered with chamois leather or other suitable material so that a tight joint may be obtained, or a washer 27 of chamois leather or other suitable material may be inserted between the face of the disk 21 and the recess in the top of the insulating disk 7. The packing rod 25 may be raised or lowered by means of a cam 26 situated in the terminal box below the meter casing. The cam 26 may be rotated by means of a handle or in any other convenient manner.

The operative elements of my improved measuring instrument are supported and inclosed within a casing comprising a rear member 30 and a coöperating cover member 31 suitably fastened thereon by means of screws 32. The cover member 31 is provided with a glass window 33 to enable a reading of the meter register which is diagrammatically indicated at 34. A terminal box 35 is secured, preferably integrally, to the rear casing member 30 and is adapted to receive the flexible connections 18 and 36 of the terminals of the meter.

I have herein described with particularity one embodiment of the novel features of my invention. It will be evident to those skilled in the art, however, that numerous changes and modifications may be made in the details of construction of the measuring instrument herein illustrated and described without departing from the spirit of my invention. I do not, therefore, wish to be limited to the specific construction or type of instrument described in this application for the purposes of illustration, but I aim in the appended claims to cover all modifications embodying the features of my invention and within its spirit and scope.

What I claim as new and desire to secure by Letters Patent of the United States, is,—

1. An electrical measuring instrument of the mercury motor type comprising, a bath of mercury, a rotatable disk operatively arranged in said mercury, a contact in electrical engagement with the mercury, and a coöperating contact in electrical engagement with the mercury and having a conducting portion rotatable about the axis of rotation of said disk.

2. An electrical measuring instrument of the mercury motor type comprising, a bath of mercury, a rotatable disk operatively arranged in the mercury, a fixed contact in electrical engagement with the mercury, and a coöperating movable contact in engagement with the mercury and comprising a rotatable ring surrounding the axis of the disk and having only a portion of its surface conducting so that when rotated the relative position of the conducting portion with respect to the fixed contact is varied.

3. An electrical measuring instrument of the mercury motor type comprising, a chamber adapted to contain mercury, a disk rotatably mounted in said chamber, contacts in electrical engagement with the mercury in said chamber, and means whereby the relative position of said contacts may be adjusted to vary the electrical resistance of the path for the flow of current between said contacts.

4. An electrical measuring instrument of the mercury motor type comprising, a chamber adapted to contain mercury, a disk rotatably mounted in said chamber, a contact in electrical engagement with the mercury, a coöperating contact having a conducting portion in electrical engagement with the mercury, and means whereby the position of said conducting portion may be adjusted to vary the electrical resistance of the path for the flow of current between said contacts.

5. An electrical measuring instrument of the mercury motor type comprising, a chamber adapted to contain mercury, a disk rotatably mounted in said chamber, a contact in electrical engagement with the mercury, a coöperating contact concentrically arranged with respect to said disk and having a conducting portion in electrical engagement with the mercury, said conducting portion being so positioned on the contact that turning of the contact varies the electrical resistance of the path for the flow of current between said contacts, and means whereby said coöperating contact can be turned.

6. An electrical measuring instrument of the mercury motor type comprising, a chamber adapted to contain mercury, a disk rotatably mounted in said chamber, a contact in electrical engagement with the mercury, a coöperating contact concentrically arranged with respect to said disk and having a conducting portion of its contacting surface in electrical engagement with the mercury and the remainder of said surface covered with insulating material, said conducting portion being so positioned on said contacting surface that turning of the contact varies the electrical resistance of the path for the flow of current between said contacts, and means whereby the coöperating contact can be turned.

7. An electrical measuring instrument of the mercury motor type comprising, a chamber adapted to contain mercury, a disk arranged in said chamber and operatively secured to a rotatably mounted shaft extending through an aperture in the top of said chamber, a sealing device surrounding the shaft and adapted to close the aperture, a spring tending to hold said sealing device in inoperative relation with said aperture, a second spring more powerful than the first mentioned spring and tending to securely position the sealing device in sealing relation with said aperture, and manually operated means for eliminating the influence of said second spring upon said sealing device.

8. An electrical measuring instrument of the mercury motor type comprising, a mercury chamber and a disk arranged in the chamber and secured to a rotatably mounted shaft, a sealing device comprising a flanged sleeve surrounding the shaft and normally held away from the top of the mercury chamber by means of a light spring, a pivoted lever adapted to engage said flanged sleeve, a stronger spring adapted to cause the lever to force the flanged sleeve into contact with the top of the mercury chamber against the action of the light spring, and a cam operated rod adapted in one position to hold the lever out of contact with the flanged sleeve and in another position to allow the stronger spring to overcome the light spring and cause the lever to force the flanged sleeve down on to the top of the mercury chamber.

In witness whereof, I have hereunto set my hand this 29 day of October, 1913.

ARTHUR PRIMROSE YOUNG.

Witnesses:
FREDK. J. SKEYLE,
W. E. ROGERS.

Copies of this patent may be obtained for five cents each, by addressing the "Commissioner of Patents, Washington, D. C."